United States Patent [19]
Lee et al.

[11] Patent Number: 5,102,213
[45] Date of Patent: Apr. 7, 1992

[54] NARROW BAND SELECTIVE ABSORPTION FILTER

[75] Inventors: James C. Lee, Plymouth; David Greenlaw; Sau K. Lo, both of Fridley, all of Minn.

[73] Assignee: Honeywell Inc., Minneapolis, Minn.

[21] Appl. No.: 486,475

[22] Filed: Feb. 28, 1990

Related U.S. Application Data

[62] Division of Ser. No. 777,063, Sep. 17, 1985, Pat. No. 4,935,166.

[51] Int. Cl.$^5$ .......................... F21V 9/00; G02B 5/20; G02B 5/22; G02C 7/10
[52] U.S. Cl. ............................ 359/890; 8/552; 8/661; 252/582; 523/137; 524/88; 359/885
[58] Field of Search ............... 252/582; 8/552, 661; 523/137; 524/88; 540/140; 350/311, 316

[56] References Cited

U.S. PATENT DOCUMENTS

| | | | |
|---|---|---|---|
| 3,853,783 | 12/1974 | Tucker | 252/582 |
| 3,895,944 | 7/1975 | Wiedemann et al. | 430/58 X |
| 4,031,109 | 6/1977 | Griffiths et al. | 540/140 X |
| 4,587,198 | 5/1986 | Fisch | 430/203 X |
| 4,622,174 | 11/1986 | McKoy et al. | 350/311 X |
| 4,935,166 | 6/1990 | Lee et al. | 252/582 |

*Primary Examiner*—Richard D. Lovering
*Attorney, Agent, or Firm*—John G. Shudy, Jr.

[57] ABSTRACT

A solid state form of a dye-solution absorption filter is disclosed. Physical vapor depositable (i.e., evaporable) dyes are codeposited with a polyester matrix in a vacuum system to randomly disperse dye molecules in a solid dilutant. The dyes are selected to absorb at the wavelengths of interest. Dilution in a transparent matrix affords narrow band absorption and good out of band transmittance. Multilayer configurations allow absorption of a plurality of wavelengths. The filter coating conforms to curved and sharply contoured surfaces and layers only 10 microns thick afford very high absorptance.

5 Claims, 4 Drawing Sheets

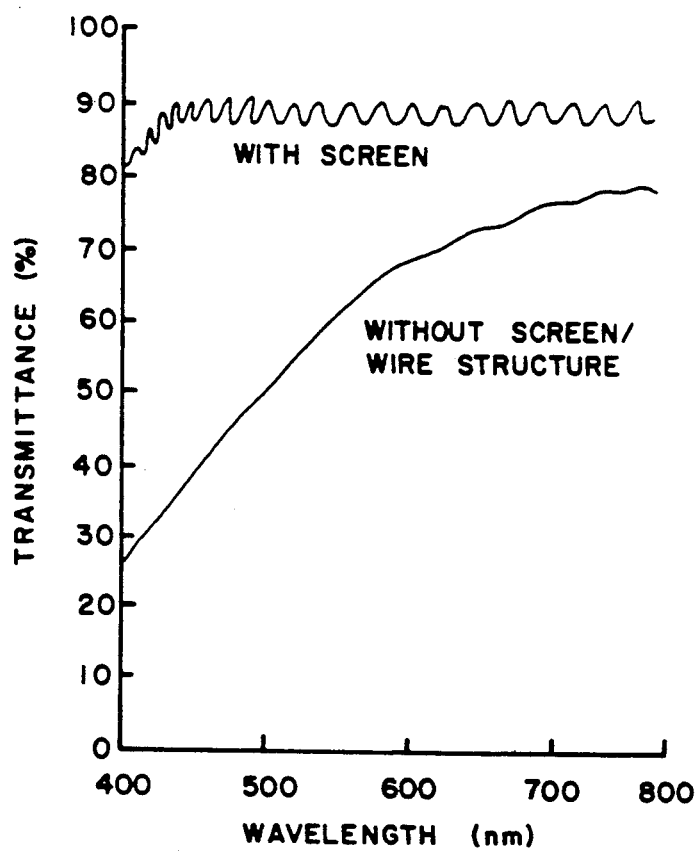
Fig. 5  SPECTRAL TRANSMITTANCE OF POLYESTER FILMS
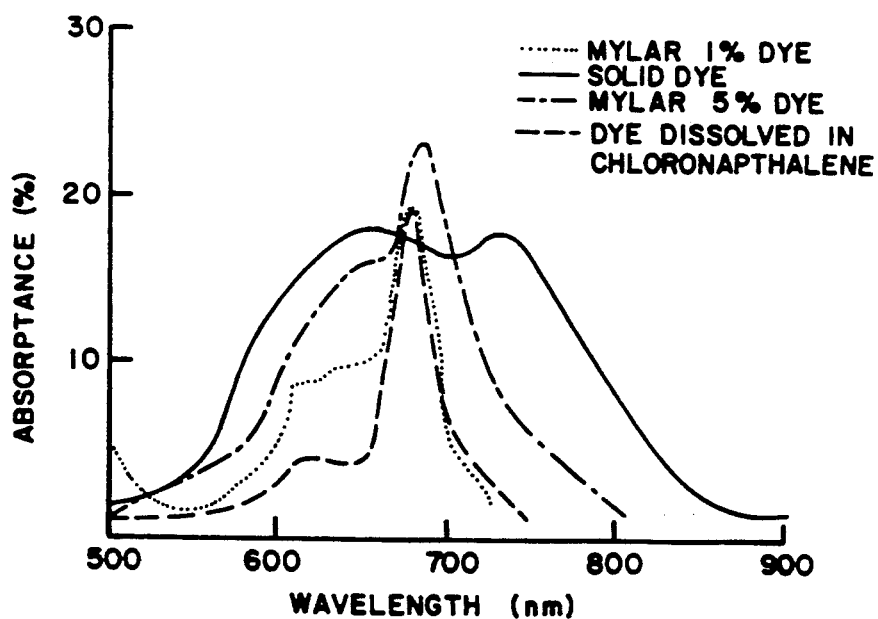
Fig. 6  ABSORPTANCE SPECTRA OF THREE $AlCl_2Pc$ - POLYESTER FILMS

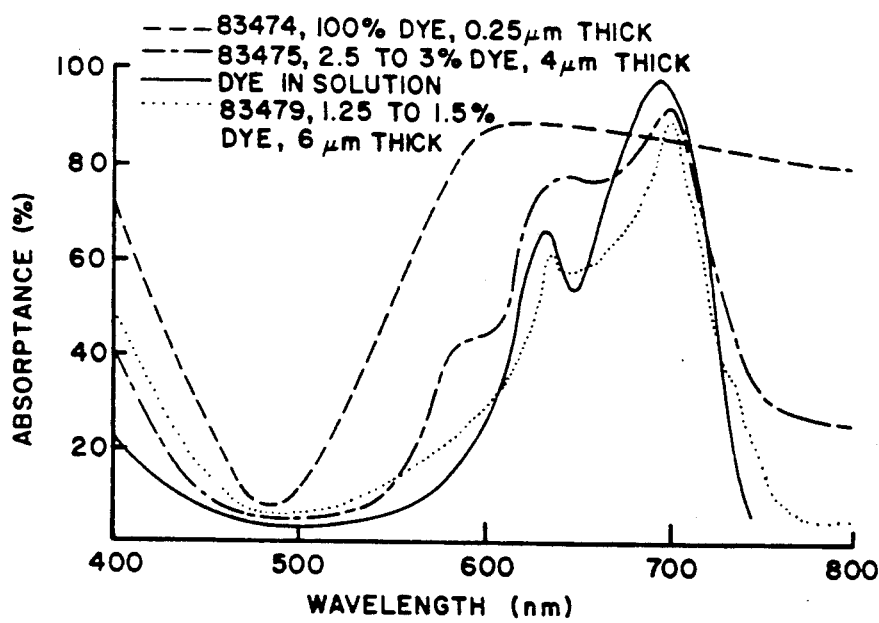
Fig. 7 ABSORPTANCE SPECTRA OF THREE VOPc-POLYESTER FILMS
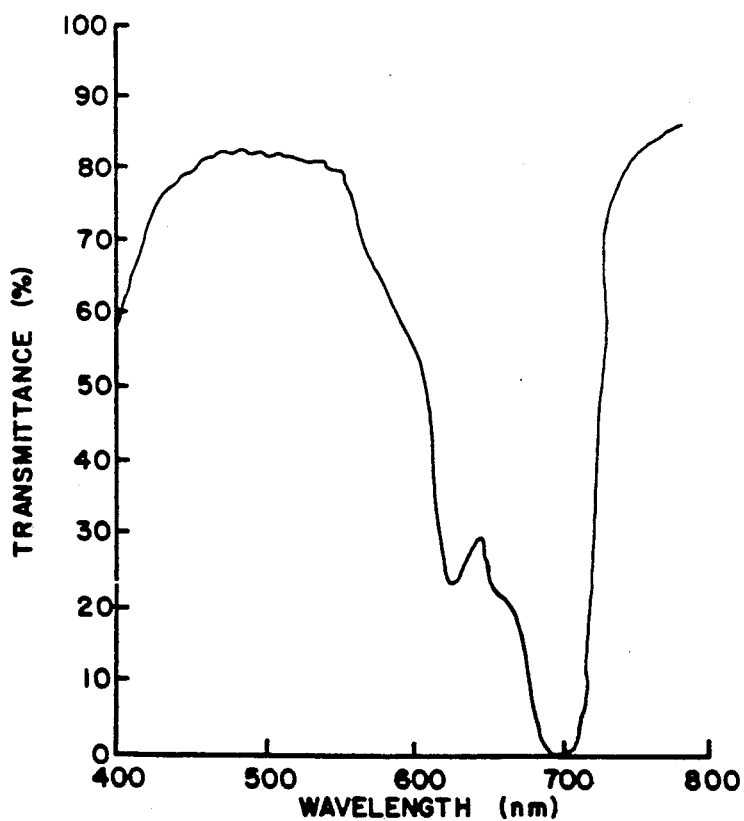
Fig. 8 SPECTRAL TRANSMITTANCE OF A VOPc-POLYESTER ABSORPTION FILTER DEPOSITED ON A PC VISOR SPECTRAL TRANSMITTANCE OF A PTOcP- POLYESTER ABSORPTION FILTER DEPOSITED ON A VISOR THE SPECTRAL TRANSMITTANCE OF A FILTER CONTAINING VOPc AND P OcP DISPERSED IN DIFFERENT LAYERS IN A POLYESTER MATRIX

NARROW BAND SELECTIVE ABSORPTION FILTER

The U.S. Government has certain rights in the present invention.

This application is a division of application Ser. No. 06/777,063, filed Sept. 17, 1985, now U.S. Pat. No. 4,935,166 issued June 19, 1990.

BACKGROUND OF THE INVENTION

1. Field of the Invention

This invention relates to absorption filters employing absorbing dyes dispersed within a transparent binder. It is particularly adapted for laser eye protection.

2. Related Art

The demand for laser protective eyewear has rapidly increased in recent years. The traditional methodology is the use of color filter glass elements. Inorganic dopants which absorb or scatter near the wavelength of interest are mixed with the glass. For example, BG-18, KG-3 or KG-5 glass (manufactured by Schott Optical Company) are absorption filters that provide protection against lasers operating near the red end of the visible spectrum. Metal ions (such as nickel oxide, cobalt oxide or chromium oxide) or phosphate are the absorbing materials in these glasses. The dopants and silica glass are melted (typically at 1000° C. to 1200° C.), blended and cooled to resolidify. The filter is then formed from the bulk material. These glass filters have sever shortcomings however.

First, these filters do not provide protection from all of the wavelengths of current interest. Second, the glass provides no protection against ballistic fragments. Third, the absorption bandwidth is generally broader than desired. In the case of BG-18, the darkening material (cobalt oxide and chromium oxide) has very poor scotopic luminuous transmittance and severely limits transmittance in the red spectral region. Another general negative aspect of glass-based protective eyewear is its weight which contributes to long term wearer fatigue and discomfort.

A thin coating that could be applied to a light-weight, ballistic protective polycarbonate (PC), yet provide high optical density (OD) at a variety of selected wavelengths and high transmittance at other wavelengths, is therefore highly desirable and, heretofore, unknown.

SUMMARY OF THE INVENTION

The present invention is a solid state realization of a liquid phase dye solution which is adapted to form a narrow band absorption filter. An evaporable dye which absorbs at a selected wavelength is diluted and held in solid form in a transparent, evaporable, inert organic polymer or inorganic compound. By diluting the dye with a transparent material, molecular band broadening interactions are reduced so that the thin solid film approximates the absorption charactersitics of the solution form of the dye.

The filter can be formed as a coating on, for example, PC, by a dual-source physical vapor deposition technique. A dye source and a dilutant source are run simultaneously with deposition rates and temperatures adjusted to provide dye concentrations of approximately 0.5% to 10% depending on the particular dye coating. Thicknesses are typically 10 microns to 20 microns.

Multiple layers of coatings with a different dye in each coating can be employed to filter additional wavelengths. An environmentally hard transparent overcoat can be applied to enhance durability.

BRIEF DESCRIPTION OF THE DRAWINGS

FIG. 5 is a graph showing the spectral transmittance of different polyester thin films.

FIG. 6 is a graph showning the absorbance of three substrates coated with films having different $AlCl_2Pc$ dye concentrations.

FIG. 7 is a graph showing the absorption of three substrates coated with films having different VOPc dye concentrations.

FIG. 8 is a graph showing spectral transmittance of a single layer VOPc-polyester absorption filter deposited on a PC visor.

DESCRIPTION OF THE PREFERRED EMBODIMENT

Figure 1A:
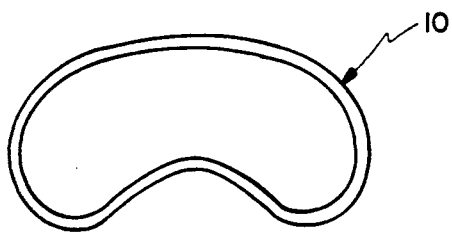
FIG. 1A is a front view schematic of a typical PC visor coated with the present invention.
Figure 1B:
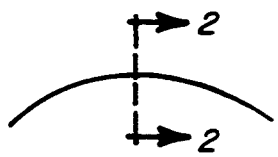
FIG. 1B is a side view of the visor of FIG. 1A.

The present invention is particularly suited for coating eyewear such as the PC visor 10 of FIGS. 1A and 1B.

Figure 2:
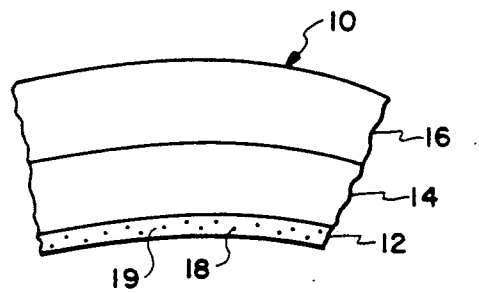
FIG. 2 is a partial, magnified cross-section taken along line 2—2 of FIG. 1B.

FIG. 2 shows a magnified cross-section of the absorption filter as applied to visor 10. A layer of the narrow band absorption filter 12 is deposited on the PC 14. A hard overcoat 16 can be used to enhance durability. Molecules of the absorbing dye 18 are dispersed substantially randomly throughout layer 12. The distribution of dye molecules need not be strictly uniform, some may even be clumped together.

Layer 12 is comprised of an evaporable dye 18 in a transparent matrix 19. By diluting the the dyes in a suitable background material to form a solid solution as described above, dye inter-molecular interactions are reduced so that (unlike prior thin films of organic dyes prepared by thermal evaporation) a very narrow spectral absorptance line width is achieved. "Evaporable" as used herein means depositable in thin film form molecularly intact by means of a physical vapor deposition technique. One such technique is thermal evaporation. For a thermal evaporation deposition process occurring at a temperature $T_p$, the materials used to form the filter coating in the present invention must meet the criterion that $T_d > T_p$, where $T_d$ for each material is the characteristic temperature of thermodynamic stability at or above which the material becomes irreversibly molecularly disrupted.

Selection of suitable dye materials as well as a suitable matrix are controlled by spectral considerations as well as the above indicated thermodynamic considerations.

PVD was determined to be an effective way to disperse the dye molecules within a solid matrix. More specifically the following classes of dyes were identified as suitable for PVD: the porphyrins; metallophthalocyanines or rare-earth diphthalocyanines; cyanines or carbocyanines; merocyanines; squaryliums; and tetracenes.

Spectrally, the dye must be a narrow band dye which absorbs strongly only at or very near the wavelength of interest, and the matrix is preferably transparent (or nearly so over a range of wavelengths that includes the wavelengths of interest) at wavelengths other than the wavelength of interest (i.e., out of band wavelengths). In general this led to examining dyes with larger molecular chain structures for the near infra-red dyes and porphyrins or cyanine dyes in the visible spectrum. Since molecular oscillator strengths and absorption bandwidths are generally inversely related, the higher the extinction ratio at the wavelengths of interest, the more likely it is that a dye will be a good candidate spectrally.

Evaporable transparent, inert organic polymers or inorganic compounds meet the spectral and thermal criteria for a matrix. Acceptable evaporable organic polymers are polyesters and polypropylenes. Hundreds of evaporable inorganic compounds are transparent in the visible region, but organic polymers are preferable as the matrix material because of their better physical properties and compatability in coating applications on PC.

Purity of the dye is important for a good quality filter, but the necessary purity is highly application dependent. Purity of one part per hundred may be suitable for some applications whereas purity of one part per ten thousand or even one part per million is desirable. Sublimation (i.e., distillation refining) is a good method to obtain ultra-pure dye crystals. However, not all porphyrins can be sublimated. Sublimation has been used extensively with phthalocyanines.

Of particular interest is an absorption filter which absorbs at both 530 nm and 694 nm. Two metallo-phthalocyanines (aluminum dichloro-phthalocyanine, $AlCl_2Pc$, and vanadyl phthalocyanine, VOPc) and a porphyrin (platinum octaethylporphine, PtOeP) were chosen as the dyes for a filter because their absorption peaks are at 678 nm, 698 nm and 534.5 nm, respectively, and each have high extinction coefficients of $10^5$.

The preferable matrix dilutant is a polyester. In particular, a polyester made by DuPont (MYLAR, type D) This polyester had an index of refraction of 1.6 and was visably clear. MYLAR is a polyester made from polyethylene terephthalate by a condensation reaction of ethylene glycol and terephthalic acid.

An effective PVD process for the dye and polyester matrix is as follows: 1) stabilize and set dye deposition rate, 2) cover dye source while keeping the dye source at a set temperature, 3) stabilize and set polyester deposition rate, 4) uncover dye source and start co-evaporation, 5) monitor only the polyester deposition rate during co-evaporation (holding the dye at a constant temperature), 6) adjust the power to the dye source in the manner that maintained a constant dye deposition rate during calibration runs.

Figure 3:
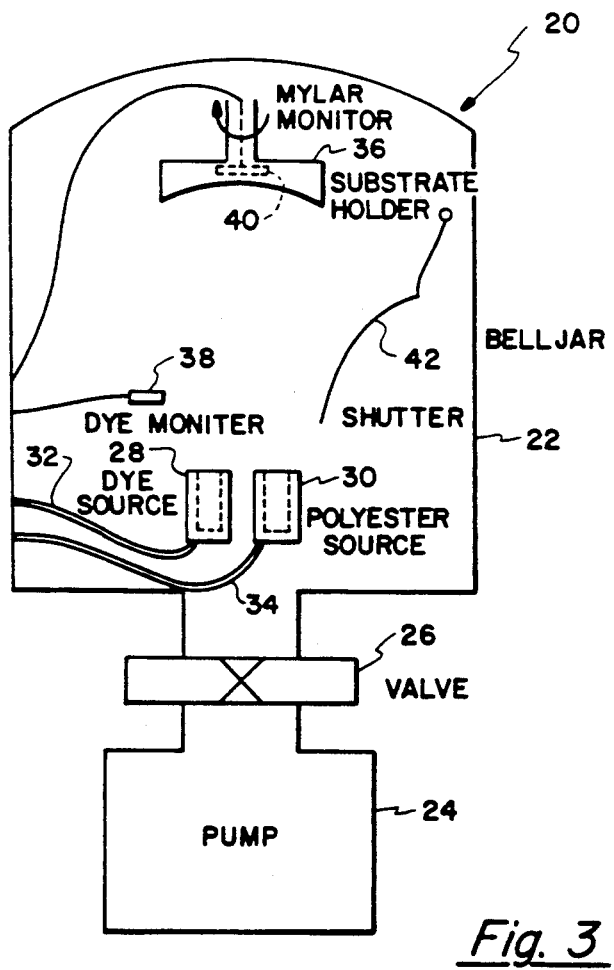
FIG. 3 is a schematic of the physical vapor deposition (PVD) system of the present invention.

FIG. 3 shows a schematic of the PVD setup employing the above process. The PVD mechanism 20 includes an evacuated chamber 22, pump means 24, control valve 26 between the pump means 24 and the chamber 22, a dye source crucible 28 and a polyester source crucible 30. Wires 32 and 34 provide the power and heat to the sources. Substrate holder 36 holds the visor or other substrate in a position so that the dye and polyester will evaporate onto the substrate. The dye monitor 38 and MYLAR polyester monitor 40 can be used to check deposition rates. A shutter 42 is rotated to cover the substrate while deposition rates are set.

Figure 4:
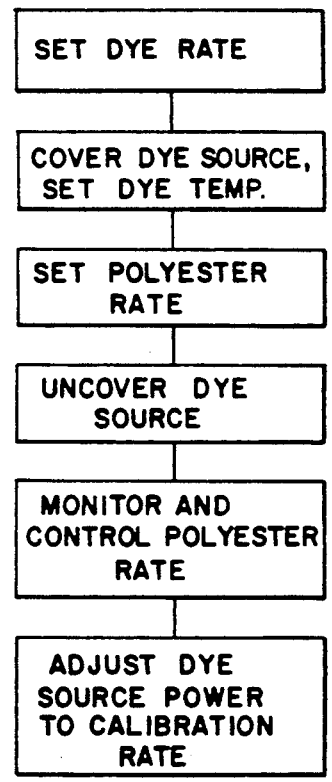
FIG. 4 summarizes the steps of the PVD process.

FIG. 4 summarizes the steps of the PVD process. During deposition of the dye and polyester, deposition of polyester on the quartz crystal used to monitor the dye deposition was unavoidable. Since the rate of polyester deposition was much larger than that of the dye, this made it impossible to monitor the rate of deposition of the dye. To fix the dye deposition rate, the temperature of the dye source was held constant during deposition of the filter.

To avoid a cloudiness that tended to appear in the deposited films due to crystallization of the polyester, it was found that an aluminum screen inserted in the polyester source crucible increased thermal equilibrium in the polyester source during evaporation. This in turn was believed to reduce the tendency of the deposited polyester to crystallize and in fact did eliminate the cloudiness.

FIG. 5 shows the marked improvement in transparency of polyester coatings (eight microns thick) with the aluminum screen being inserted in the polyester source. The reason for this improvement could be a relatively narrow temperature region in which the polyester sublimes without molecular disintegration. By promoting uniform temperature in the polyester source one can operate in this narrow temperature region for most of the material load in the crucible. This process temperature range is estimated to be 320°-340° C. (i.e. $T_p$) for MYLAR polyester.

Normal deposition time was between twenty and fifty minutes. This was sufficient to grow films of about 10 microns thick. Deposition rates were typically 30 Å/sec. Dye concentration defined as the ratio of the thickness of the dye in the film if deposited separately, to the total thickness of the deposited film) was settled at 0.8% for VOPc and 9% to 10% for PtOeP.

As a first feasibility demonstration of the dye-matrix absorption filter, several substrates were coated with different concentrations of two metallo-phthalocyanines. Variations in absorption versus wavelength as a function of $AlCl_2Pc$ concentration for three substrates coated with the dye-polyester film are shown in FIG. 6.

FIG. 7 shows variations in absorptance versus wavelength as a function of VOPc concentration for three substrates. The lowest concentration in both cases approximated a liquid solution of the dye in chloronapthalene. Thus the thesis of isolating the dye molecules in a solid matrix to reproduce the narrow absorption band characteristics of a dye in a solution was confirmed.

Figure 9:
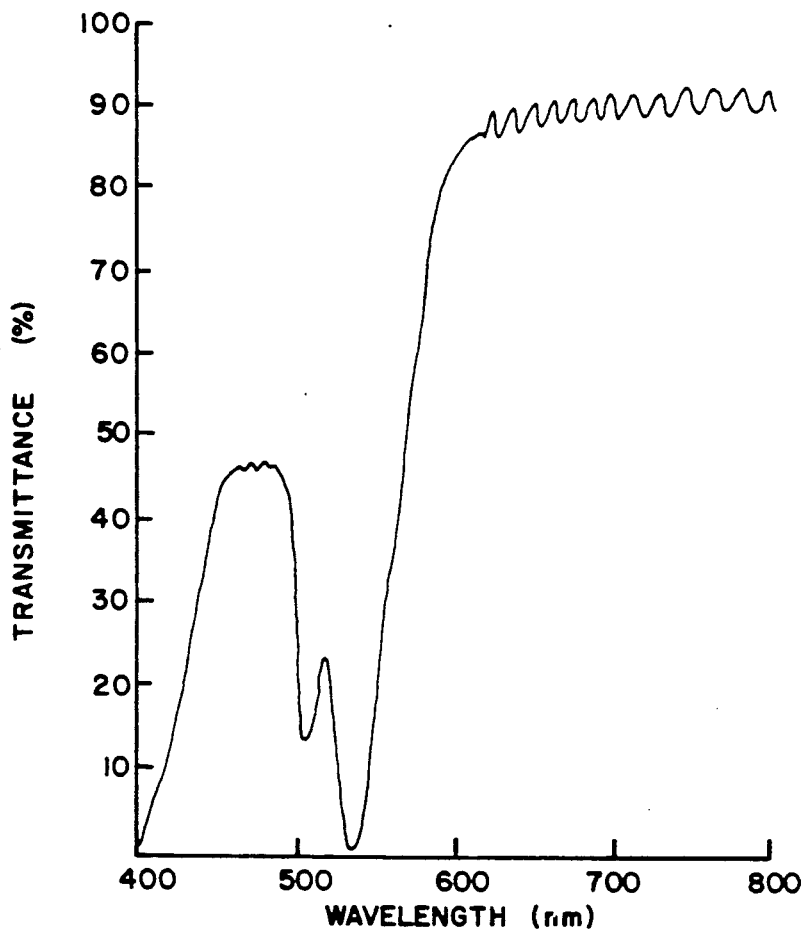
FIG. 9 is a graph showing spectral transmittance of a single layer PtOeP-polyester absorption filter deposited on a PC visor.

FIGS. 8 and 9 correspond to the first row of data of tables 1 and 2, respectively.

FIG. 8 shows the spectral transmittance of a VOPc-polyester thin films and FIG. 9 shows the spectral transmittance of a PtOeP-polyester thin film. Tables 1 and 2 include data for films other than these shown in FIGS. 8 and 9, but which demonstrated very similar spectral transmission characteristics to that of FIGS. 8 and 9. Dye source temperatures ($T_p$) were 350°-400° C. for the $AlCl_2Pc$ dye, 340°-360° C. for the VoPc dye and 340°-350° C. for the PtOeP dye.

TABLE 1

LIST OF VISORS AND LENSES COATED WITH
VOPc (MYLAR POLYESTER) ABSORPTION FILTERS

| Run Number | Visor/Lens | Absorption Peak λ1(nm) λ2(nm) | OD | Bandwidth FWHM (nm) | Total Thickness (μm) % Dye VOPc |
| --- | --- | --- | --- | --- | --- |
| 84205 | Visor | 700 | 2.5 | 113 | 10 |
|  |  | 694 | 2.0 |  | 0.78 |
| 84206 | Visor | 700 | 2.7 | 116 | 10 |
|  |  | 694 | 2.5 |  | 0.86 |
| 84311 | Visor | 700 | 2.7 | 116 | 10 |
|  |  | 694 | 2.6 |  | 0.82 |
| 84315 | Lenses |  |  | 105 | 10 |
|  |  | 700 | 2.4 |  | 0.78 |
|  |  | 694 | 2.0 |  |  |

TABLE 2

LIST OF VISORS AND LENSES COATED WITH
PtOeP POLYESTER (MYLAR POLYESTER)
ABSORPTION FILTERS

| Run Number/ | Visor/Lens | Absorption Peaks λ1(nm) λ2(nm) | OD | Bandwidth FWHM (nm) | Total Thickness (μm) % Dye Pt-OeP |
| --- | --- | --- | --- | --- | --- |
| 84328-1 | Visor | 537.5 | 2.8 | 72 | 10 |
|  |  | 532 | 1.7 |  | 9.3 |
| 84328-2 | Visor | 537.5 | 2.8 | 70 | 10 |
|  |  | 532 | 1.7 |  | 9.3 |
| 84329-1 | Visor | 537.5 | 2.3 | 60 | 10 |
|  |  | 532 | 1.3 |  | 9.7 |
| 84334 | Lenses | 537.5 | 2.7 | 62 | 10 |
|  |  | 532 | 1.6 |  | 10.5 |

Figure 10:
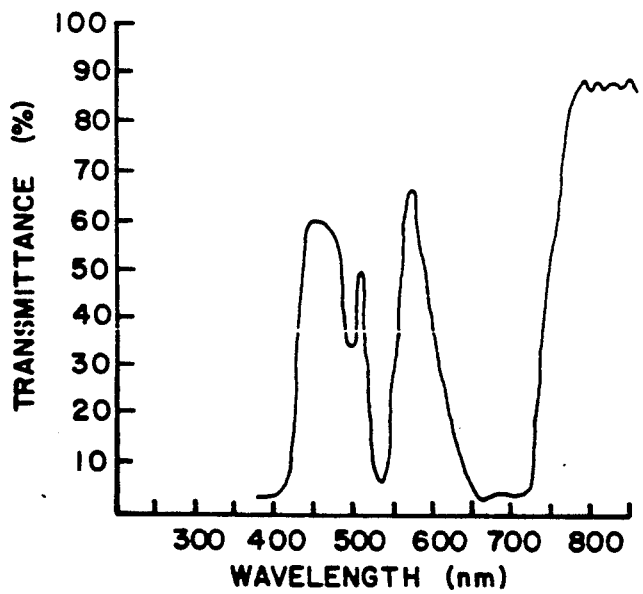
FIG. 10 is a graph showing spectral transmittance of a two layer filter containing VOPc-polyester in one layer and PtOeP-polyester in a second layer.

FIG. 10 shows spectral transmission of a dual layer thin film filter. Each layer is about 10 microns thick with an optical density of 1-3 for the PtOeP layer and optical density of 2-3 for the VOPc layer. In the dual layer embodiment, cloudiness appeared in later deposition runs. This was found to be related to the RTV silicone mold substrate holder. This problem was solved after the holder was switched to a metal holder.

To provide an abrasion-resistant overcoat (such as 16 in FIG. 1), it is preferred to first coat the absorption layer with a thin (approximate 1000 Å) plasma-polymerized hexamethyldisiloxane (HMDS) to provide a barrier coat. Then apply approximately 5 microns of a ultraviolet cured, silicone polymer (such as 3M brand PHOTOGARD). The overcoat also increases adhesion of the filter coating to the visor.

The above invention has been described with regard to specific dyes and one or two layers of thin film. Of course, numerous layers with a different dye in each layer can be employed with the dye selected to absorb at a particular wavelength. Thereby, a plurality of wavelengths can be filtered by a plurality of layers. Further, the particular dyes described above are given merely by way of example and other evaporable dyes in the classes listed may be employed. Further, the PC substrate is given merely by way of example and other substrate materials can be utilized. The invention is particularly useful for coating curved and contoured surfaces.

What is claimed is:

1. A substrate having thereon a thin film coating, produced by physical vapor deposition, for filtering a selected wavelength of electromagnetic energy, said selected wavelength being within a range of wavelengths, said coating comprising:
   a dye selected from the group consisting of the porphryins, metallo-phthalocyanines, rare-earth diphthalocyanines, cyanines, carbocyanines, merocyanines, squaryliums and tetracenes, wherein said dye strongly absorbs at said selected wavelength;
   an inert organic polymer for diluting and holding said dye in a solid form, said polymer being substantially transparent to at least the majority of wavelengths in said range other than said selected wavelength, and wherein molecules of said dye are dispersed substantially randomly throughout said polymer; and
   wherein said thin film coating is applied to the substrate.

2. A polycarbonate substrate having thereon a thin film coating, produced by physical vapor deposition, for filtering a selected wavelength of electromagnetic energy, said selected wavelength being within the range of wavelengths, said coating comprising:
   a dye selected from the group consisting of the porphryins, metallo-phthalocyanines, rare-earth diphthalocyanines, cyanines, carbocyanines, merocyanines, squaryliums and tetracenes, wherein said dye strongly absorbs at said selected wavelength;
   an inert organic polymer for diluting and holding said dye in a solid form, said polymer being substantially transparent to at least the majority of wavelengths in said range other than said selected wavelength, and wherein molecules of said dye are dispersed substantially randomly throughout said polymer; and
   wherein said thin film coating is applied to a polycarbonate.

3. The coating of claim 2 further including an environmentally hard overcoat covering said polycarbonate.

4. The coating of claim 3 further including a barrier coat of plasma-polymerized HMDS applied to said polycarbonate, and wherein said overcoat is applied to said barrier coat and is a silicone polymer.

5. A substrate having thereon a plurality of thin films, each thin film of said plurality produced by physical vapor deposition and for filtering a selected wavelength of electromagnetic energy, said selected wavelength being within a range of wavelengths, said each thin film comprising:
   a dye selected from the group consisting of the porphryins, metallo-phthalocyanines, rare-earth diphthalocyanines, cyanines, carbocyanines, merocyanines, squaryliums and tetracenes, wherein said dye strongly absorbs at said selected wavelength; and
   an inert organic polymer for diluting and holding said dye in a solid form, said polymer being substantially transparent to at least the majority of wavelengths in said range other than said selected wavelength, and wherein molecules of said dye are dispersed substantially randomly throughout said polymer.

* * * * *